US009435431B1

(12) United States Patent
Lundberg et al.

(10) Patent No.: US 9,435,431 B1
(45) Date of Patent: Sep. 6, 2016

(54) CLUTCH AND TORQUE CONVERTER CONTROL FOR A CONTINUOUSLY VARIABLE TRANSMISSION

(71) Applicant: GM Global Technology Operations LLC, Detroit, MI (US)

(72) Inventors: Philip C. Lundberg, Keego Harbor, MI (US); Steven P. Moorman, Dexter, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 9 days.

(21) Appl. No.: 14/643,655

(22) Filed: Mar. 10, 2015

(51) Int. Cl.

| | |
|---|---|
| ***F16D 35/00*** | (2006.01) |
| ***F16H 61/14*** | (2006.01) |
| ***F16H 61/12*** | (2010.01) |
| ***F16H 61/662*** | (2006.01) |
| ***F16H 61/00*** | (2006.01) |
| ***F16H 61/02*** | (2006.01) |
| ***F16H 45/00*** | (2006.01) |

(52) U.S. Cl.

CPC .............. *F16H 61/14* (2013.01); *F16H 45/00* (2013.01); *F16H 61/0021* (2013.01); *F16H 61/0265* (2013.01); *F16H 61/12* (2013.01); *F16H 61/662* (2013.01); *F16H 2061/1252* (2013.01)

(58) Field of Classification Search

CPC .. F16H 61/14; F16H 61/662; F16H 61/0265; F16H 61/12; F16H 61/0021; F16H 45/00; F16H 2061/1252

See application file for complete search history.

(56) References Cited

U.S. PATENT DOCUMENTS

| | | | | | |
|---|---|---|---|---|---|
| 6,619,323 | B1 * | 9/2003 | Stafford | F16H 61/0021 | 137/271 |
| 6,826,908 | B1 * | 12/2004 | Stafford | F16H 61/0021 | 475/127 |
| 8,967,350 | B2 * | 3/2015 | Fujii | F16D 27/115 | 192/35 |
| 2003/0155200 | A1 * | 8/2003 | Moorman | F16H 61/143 | 192/3.51 |
| 2004/0063525 | A1 * | 4/2004 | Ochiai | F16H 57/0434 | 474/28 |
| 2004/0063526 | A1 * | 4/2004 | Nobu | F16H 61/66272 | 474/28 |
| 2004/0063543 | A1 * | 4/2004 | Wakayama | F16H 61/143 | 477/175 |
| 2007/0168267 | A1 * | 7/2007 | Zimmerman | G06Q 40/00 | 705/35 |
| 2010/0186209 | A1 * | 7/2010 | Younger | F16H 61/14 | 29/402.03 |
| 2013/0333508 | A1 | 12/2013 | Lundberg et al. | | |
| 2014/0357434 | A1 | 12/2014 | Lundberg | | |
| 2014/0360302 | A1 | 12/2014 | Lundberg | | |

* cited by examiner

*Primary Examiner* — David J Hlavka

(57) ABSTRACT

A hydraulic control system with clutch and torque converter control for a CVT includes a pressure regulator subsystem, a cooler subsystem, a manual valve assembly, and a torque converter control valve assembly connected to the torque converter clutch (TCC) and the cooler subsystem. A boost valve assembly is connected to the pressure regulator subsystem, the manual valve assembly, and the torque converter clutch control valve assembly. A clutch control solenoid is configured to move the boost valve to the boost position and the control valve to the release position and to control a pressure of the hydraulic fluid provided to the manual valve assembly. A TCC control solenoid is configured to move the boost valve to the boost position and to control a pressure of the hydraulic fluid provided to the torque converter control valve assembly.

15 Claims, 4 Drawing Sheets

CLUTCH AND TORQUE CONVERTER CONTROL FOR A CONTINUOUSLY VARIABLE TRANSMISSION

TECHNICAL FIELD

The invention relates to a control system for a continuously variable transmission, and more particularly to an electro-hydraulic clutch and torque converter control system having a clutch boost mode and failure control for a continuously variable transmission.

BACKGROUND

A typical continuously variable transmission (CVT) includes a hydraulic control system that is employed to provide cooling and lubrication to components within the CVT and to actuate torque transmitting devices such as drive clutches or torque converter clutches, and belt pulley positions. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices and the pulleys that move the belt of the CVT. The pressurized hydraulic fluid delivered to the pulleys is used to position the belt relative to input and output variators in order to obtain different gear ratios.

While previous hydraulic control systems are useful for their intended purpose, the need for new and improved hydraulic control system configurations within CVT's which exhibit improved performance, especially from the standpoints of efficiency, responsiveness and smoothness, is essentially constant. Accordingly, there is a need for an improved, cost-effective hydraulic control system for use in a hydraulically actuated CVT.

SUMMARY

A hydraulic control system with clutch and torque converter control for a CVT is provided. The hydraulic control system includes a pressure regulator subsystem providing a pressurized hydraulic fluid, a cooler subsystem for reducing a temperature of the pressurized hydraulic fluid, a manual valve assembly configured to selectively communicate the pressurized hydraulic fluid to the forward clutch and the reverse clutch, and a torque converter control valve assembly connected to the TCC and the cooler subsystem. The torque converter control valve assembly includes a control valve moveable between an apply position that allows pressurized hydraulic fluid to communicate with an apply side of a torque converter clutch (TCC) and a release position that allows pressurized hydraulic fluid to communicate with a release side of the TCC and then to the cooler subsystem. A boost valve assembly is connected to the pressure regulator subsystem, the manual valve assembly, and the torque converter clutch control valve assembly. The boost valve assembly includes a boost valve moveable between a boost position that allows pressurized hydraulic fluid from the pressure regulator subsystem to communicate with the manual valve, and a failsafe position that allows pressurized hydraulic fluid from the pressure regulator subsystem to communicate with the torque converter control valve assembly through to the cooler subsystem. A clutch control solenoid is configured to move the boost valve to the boost position and the control valve to the release position and to control a pressure of the hydraulic fluid provided to the manual valve assembly. A TCC control solenoid is configured to move the boost valve to the boost position and to control a pressure of the hydraulic fluid provided to the torque converter control valve assembly.

In one aspect of the present invention, a clutch pressure regulator valve assembly is disposed downstream of the clutch control solenoid and the pressure regulator subsystem and upstream of the boost valve assembly, and the clutch pressure regulator valve assembly regulates a pressure of hydraulic fluid from the pressure regulator subsystem provided to the boost valve assembly based on an output from the clutch control solenoid.

In another aspect of the present invention, the boost valve allows the regulated pressurized hydraulic fluid from the clutch control solenoid to communicate with the manual valve when the boost valve is in the failsafe position.

In another aspect of the present invention, a TCC pressure regulator valve assembly is disposed downstream of the TCC control solenoid and the pressure regulator subsystem and upstream of the torque converter control valve assembly, and the TCC regulator valve assembly regulates a pressure of hydraulic fluid from the pressure regulator subsystem provided to the torque converter control valve assembly based on an output from the TCC control solenoid.

In another aspect of the present invention, the clutch control solenoid is normally high.

In another aspect of the present invention, the TCC control solenoid is normally low.

In another aspect of the present invention, the clutch control solenoid moves the boost valve to the boost position if the TCC control solenoid fails.

In another aspect of the present invention, the control valve is biased to the apply position by a first spring.

In another aspect of the present invention, the boost valve is biased to the failsafe position by a second spring.

Further aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
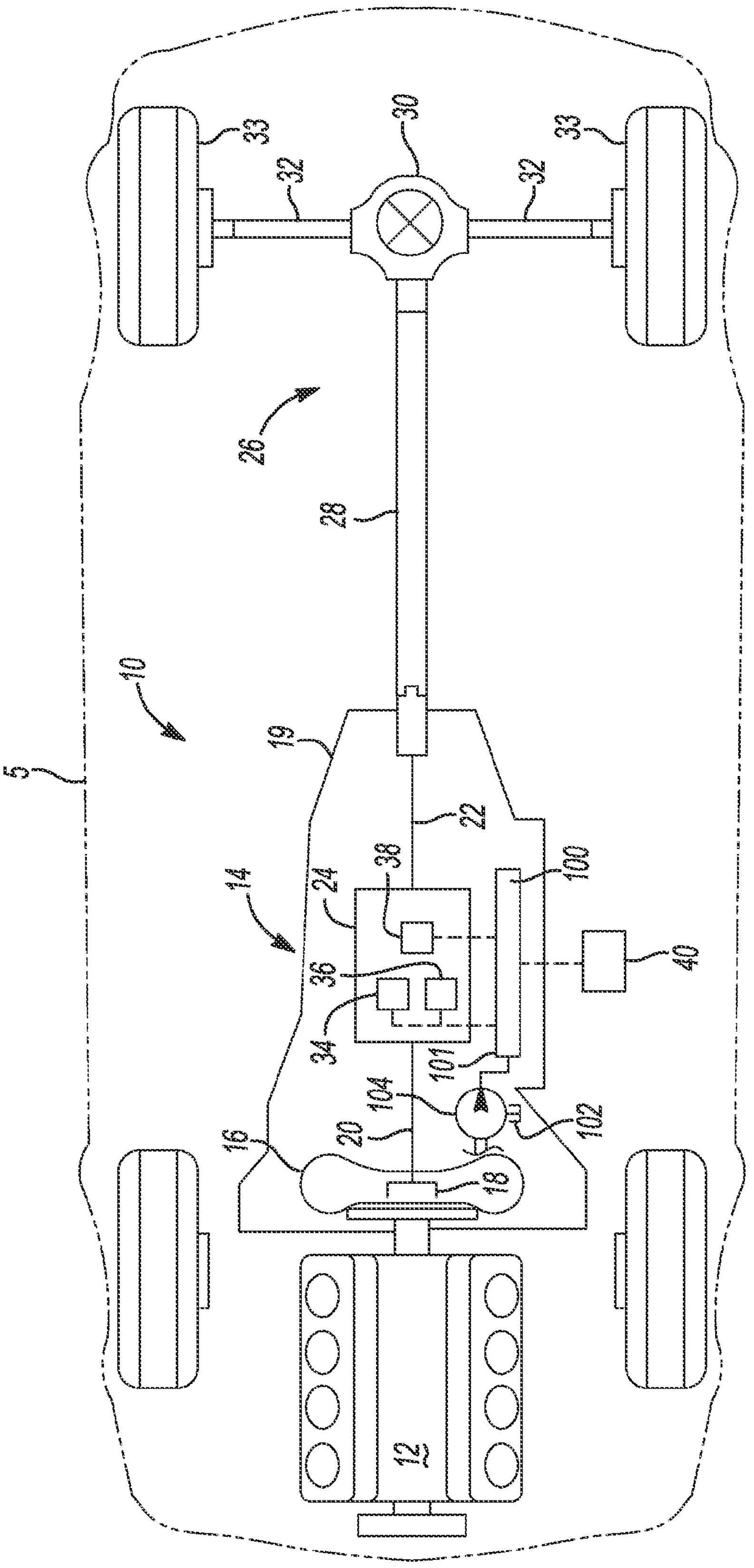
FIG. 1 is a diagram of an exemplary powertrain having a clutch and torque converter control system according to the principles of the present invention.

With reference to FIG. 1, a motor vehicle is illustrated and generally indicated by reference number 5. The motor vehicle 5 is illustrated as a passenger car, but it should be appreciated that the motor vehicle 5 may be any type of vehicle, such as a truck, van, sport-utility vehicle, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, hybrid engine, or any other type of prime mover, without departing from the scope of the present disclosure. The engine 12 supplies a driving torque to the transmission 14 through a torque converter 16. The torque converter 16 includes a torque converter clutch 18 that, when applied or engaged, mechanically couples the output of the engine 12 to the input of the transmission 14.

The transmission 14 is preferably a continuously variable transmission and has a typically cast, metal housing 19 which encloses and protects the various components of the transmission 14. The housing 19 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a powerflow arrangement 24 of gears, clutches, and pulleys. The transmission input shaft 20 is functionally interconnected with the engine 12 via the torque converter 16 and receives input torque or power from the engine 12. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the powerflow arrangement 24.

The powerflow arrangement 24 generally includes a forward clutch 34, a reverse clutch or brake 36, and a pulley assembly 38. The powerflow arrangement 24 may also include a plurality of gear sets, a plurality of shafts, and additional clutches or brakes. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The forward clutch 34 is selectively engageable to initiate a forward drive mode while the reverse clutch or brake 36 is selectively engageable to initiate a reverse drive mode. The pulley assembly 38 is a continuously variable unit that includes a chain or belt wrapped between a primary pulley and a secondary pulley (not shown). Translation of the pulleys correlates to movement of the belt or chain which continuously varies the output or gear ratio of the transmission 14.

The transmission 14 includes a transmission control module 40. The transmission control module 40 is preferably an electronic control device having a preprogrammed digital computer or processor, control logic or circuits, memory used to store data, and at least one I/O peripheral. The control logic includes or enables a plurality of logic routines for monitoring, manipulating, and generating data and control signals. The transmission control module 40 controls the actuation of the forward clutch 34, the reverse clutch or brake 36, the pulley assembly 38, and the torque converter clutch 18 via a hydraulic control system 100. In another example, the transmission control module 40 is an engine control module (ECM), or a hybrid control module, or any other type of controller.

The hydraulic control system 100 is disposed within a valve body 101 that contains and houses via fluid paths and valve bores most of the components of the hydraulic control system 100. These components include, but are not limited to, pressure regulation valves, directional valves, solenoids, etc. The valve body 101 may be attached to a bottom of the transmission housing 19 in rear-wheel drive transmissions or attached to a front of the transmission housing 19 in front-wheel drive transmissions. The hydraulic control system 100 is operable to selectively engage the clutches/brakes 34, 36, 18 and to provide cooling and lubrication to the transmission 14 by selectively communicating a hydraulic fluid from a sump 102 under pressure from either an engine driven pump 104 or an accumulator (not shown). The pump 104 may be driven by the engine 12 or by an auxiliary engine or electric motor.

Figure 2:
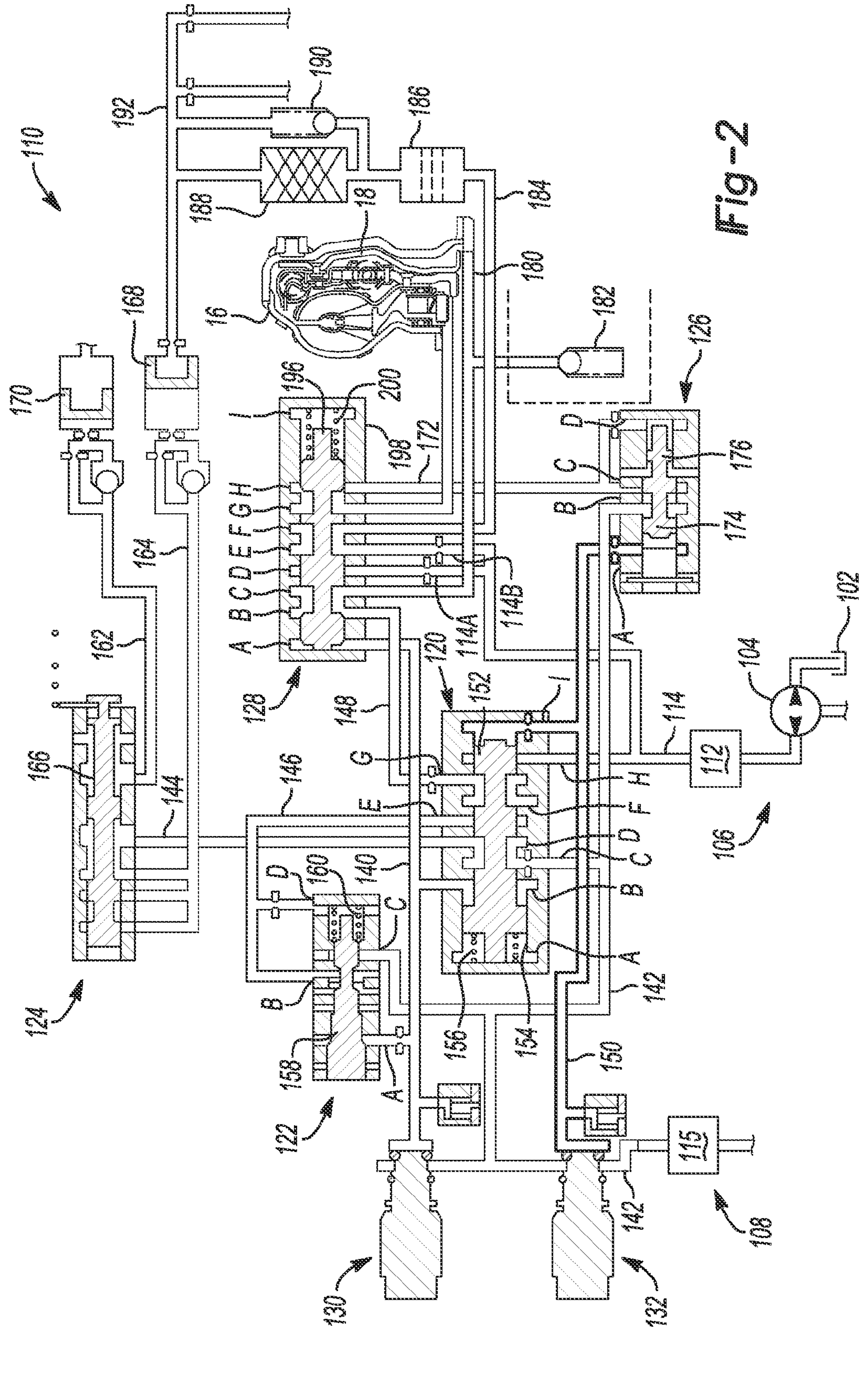
FIG. 2 is a diagram of a portion of a hydraulic control system according to the principles of the present invention.

With reference to FIG. 2, a portion of the hydraulic control system 100 is illustrated. The hydraulic control system 100 generally includes a plurality of interconnected or hydraulically communicating subsystems including a pressure regulator subsystem 106, an actuator feed subsystem 108, and a clutch and torque converter clutch control subsystem 110. The hydraulic control system 100 may also include various other subsystems or modules, such as a lubrication subsystem or a pulley or ratio control subsystem, without departing from the scope of the present invention.

The pressure regulator subsystem 106 is operable to provide and regulate pressurized hydraulic fluid, such as transmission oil, throughout the hydraulic control system 100. The pressure regulator subsystem 106 draws hydraulic fluid from the sump 102. The sump 102 is a tank or reservoir preferably disposed at the bottom of the transmission housing 19 to which the hydraulic fluid returns and collects from various components and regions of the transmission. The hydraulic fluid is forced from the sump 102 and communicated throughout the hydraulic control system 100 via the pump 104. The pump 104 may be, for example, a gear pump, a vane pump, a gerotor pump, or any other positive displacement pump. The pressure regulator subsystem 106 may also include an alternate source of hydraulic fluid that includes an auxiliary pump (not shown) preferably driven by an electric engine, battery, or other prime mover (not shown), or an accumulator. The hydraulic fluid from the pump 104 is controlled by a pressure regulator valve 112. The pressure regulator valve 112 regulates the pressure of the hydraulic fluid from the pump 104 and feeds pressurized hydraulic fluid to a converter feed line 114. The pressure regulator subsystem 106 may also include various other valves and solenoids without departing from the scope of the present invention.

The actuator feed subsystem 108 provides hydraulic fluid to various control devices or actuators, such as solenoids, throughout the hydraulic control system 100. The actuator feed subsystem 108 includes a feed limit valve 115 that controls or limits the pressure of hydraulic fluid supplied to the actuators.

The clutch and torque converter clutch control subsystem 110 controls the engagement of the forward and reverse clutches 34, 36, engagement of the torque converter clutch 18, and cooling of the torque converter 16. The clutch and torque converter clutch control subsystem 110 generally includes a boost valve assembly 120, a clutch pressure regulation valve assembly 122, a manual valve assembly 124, a torque converter clutch (TCC) pressure regulation valve assembly 126, a torque converter control valve assembly 128, a clutch control solenoid 130, and a TCC control solenoid 132.

The boost valve assembly 120 includes ports 120A-I, numbered consecutively from left to right in FIG. 2. Ports 120A and 120F are exhaust ports that communicate with the sump 102 or an exhaust backfill circuit (not shown). Port 120B is connected to, or in fluid communication with, the clutch control solenoid 130 via a signal line 140. Port 120C is connected to the actuator feed subsystem 108 via an actuator feed line 142. Port 120D is connected to the manual valve assembly 124 via a fluid line 144. Port 120E is connected to the clutch pressure regulation valve assembly 122 via a fluid line 146. Port 120G is connected to the torque converter control valve assembly 128 via a fluid line 148. Port 120H is connected to and receives pressurized hydraulic fluid from the converter feed line 114. Port 120I is connected to the TCC solenoid 132 via a signal line 150.

The boost valve assembly 120 further includes a spool valve 152 slidably disposed within a bore 154 formed in the valve body 101. The spool valve 152 is moveable between boost position with the spool valve 152 moved to the left as shown in FIG. 2, and a failsafe position with the spool valve 152 moved to the right. A biasing member 156, such as a coiled spring, biases the spool valve 152 to the failsafe position. Hydraulic fluid from either the clutch control solenoid 130, via signal line 140, or from the TCC solenoid 132, via signal line 150, moves the spool valve 152 to the boost position. In the boost position, port 120C communicates with port 120D, port 120E is closed off, port 120G exhausts through port 120F, and port 120H is closed off. In the failsafe position, port 120E communicates with port 120D and port 120H communicates with port 120G.

The clutch pressure regulation valve assembly 122 regulates hydraulic fluid pressure communicated to the manual valve assembly 124 through the boost valve assembly 120. The clutch pressure regulation valve assembly 122 includes fluid ports 122A-D, numbered from left to right in FIG. 2. Port 122A is connected to the signal line 140. Ports 122B and 122D are connected to the fluid line 146. Fluid port 122C is connected to and receives hydraulic fluid from the actuator feed line 142. A regulation valve 158 is positioned within the clutch pressure regulation valve assembly 122. The regulation valve 158 regulates the pressure of hydraulic fluid communicated from port 122C to port 122B, and therefore to the manual valve assembly 124. The regulation valve 158 is positioned by a pressure signal sent from the clutch control solenoid 130 via port 122A. The clutch control solenoid 130 commands a fluid pressure by sending pressurized hydraulic fluid to port 122A to act on the regulation valve 158. Simultaneously, hydraulic fluid from port 122B feeds back on the regulation valve 158 via port 122D and acts on the opposite side of the regulation valve 158. Pressure balance between the commanded pressure from the clutch control solenoid 130, pressure within the fluid line 146 and a spring 160 is achieved as the regulation valve 158 moves and allows selective communication between port 122C and 122B.

The manual valve assembly 124 communicates with the fluid line 144, a reverse line 162, and with a drive line 164. Movement of a range selector by an operator of the motor vehicle in turn translates a manual valve 166 between various positions including a reverse position and a drive position. In the drive position, the fluid line 144 communicates with the drive line 164. In the reverse position the feed line 144 communicates with the reverse line 162. The drive line 164 communicates with a drive clutch actuator 168 and the reverse line 162 communicates with the reverse clutch actuator 170. The drive clutch actuator 168 selectively engages the forward clutch 34 and the reverse clutch actuator 170 selectively engages the reverse clutch or brake 36.

The TCC pressure regulation valve assembly 126 regulates hydraulic fluid pressure communicated to the torque converter control valve assembly 130. The TCC pressure regulation valve assembly 126 includes fluid ports 126A-D, numbered from left to right in FIG. 2. Port 126A is connected to the signal line 150. Fluid port 122B is connected to and receives hydraulic fluid from the actuator feed line 142. Ports 122C and 122D are connected to a fluid line 172. A regulation valve 174 is positioned within the TCC pressure regulation valve assembly 126. The regulation valve 174 regulates the pressure of hydraulic fluid communicated from port 126B to port 126C, and therefore to the torque converter control valve assembly 128 via fluid line 172. The regulation valve 174 is positioned by a pressure signal sent from the TCC control solenoid 132 via port 126A. The TCC control solenoid 132 commands a fluid pressure by sending pressurized hydraulic fluid to port 126A to act on the regulation valve 174. Simultaneously, hydraulic fluid from port 126C feeds back on the regulation valve 174 via port 126D and acts on the opposite side of the regulation valve 174. Pressure balance between the commanded pressure from the TCC control solenoid 132, pressure within the fluid line 172 and a spring 176 is achieved as the regulation valve 174 moves and allows selective communication between port 126B and 126C.

The torque converter control valve assembly 128 controls the engagement of the torque converter clutch 18 within the torque converter 16. The torque converter control valve assembly 128 includes ports 128A-I, numbered consecutively from left to right in FIG. 2. Port 128A is connected to the signal line 140. Port 128B is connected to the fluid line 148. Port 128C is connected to a TCC release line 180. The TCC release line 180 communicates with a blow-off valve 182 and with a release side of the torque converter clutch 18. Ports 128D and 128E communicate with parallel branches 114A and 114B of the converter feed line 114. Port 128F communicates with a cooler line 184. The cooler line 184 communicates with a cooler 186 and a filter 188 disposed in series with one another. The cooler 186 reduces a temperature of hydraulic fluid flowing through the cooler 186, as is known in the art. A blow-off valve 190 is disposed in parallel with the filter 188. Hydraulic fluid from the cooler 186 and filter 188 communicate through an exhaust backfill circuit 192 with the sump 102. Port 128G is connected to a TCC apply line 194. The TCC apply line 194 communicates with an apply side of the torque converter clutch 18. Port 128H communicates with the TCC pressure regulator valve assembly 126 via fluid line 172. Port 128I is an exhaust port that communicates with the sump 102 or an exhaust backfill circuit.

The torque converter control valve assembly 128 includes a spool valve 196 slidably disposed within a bore 198 formed in the valve body 101. The spool valve 196 is moveable between an apply position with the spool valve 196 moved to the left as shown in FIG. 2, and a release position with the spool valve 196 moved to the right. A biasing member 200, such as a coiled spring, biases the spool valve 196 to the apply position. Hydraulic fluid from the clutch control solenoid 130, via signal line 140, moves the spool valve 196 to the release position. In the apply position, port 128B communicates with port 128C, port 128D is blocked, port 128E communicates with port 128F, and port 128H communicates with port 128G. In the release position, port 128B is blocked, port 128C communicates with port 128D, port 128E is blocked, port 128F communicates with port 128G, and port 128H is blocked.

The clutch control solenoid 130 is configured to control the position of the clutch pressure regulator valve assembly 122 and to move the boost valve assembly 120 and the torque converter control valve assembly 128 by selectively communicating pressurized hydraulic fluid from the actuator feed subsystem 108, via the actuator feed line 142, to the signal line 140. The clutch control solenoid 130 is preferably a normally high solenoid. The clutch control solenoid 130 is in electrical communication with the transmission control module 40.

The TCC control solenoid 132 is configured to control the position of the TCC pressure regulator valve assembly 126 and to move the boost valve assembly 120 by selectively communicating pressurized hydraulic fluid from the actuator feed subsystem 108, via the actuator feed line 142, to the signal line 150. The TCC control solenoid 132 is preferably a normally low solenoid. The TCC control solenoid 132 is in electrical communication with the transmission control module 40.

Figure 3:
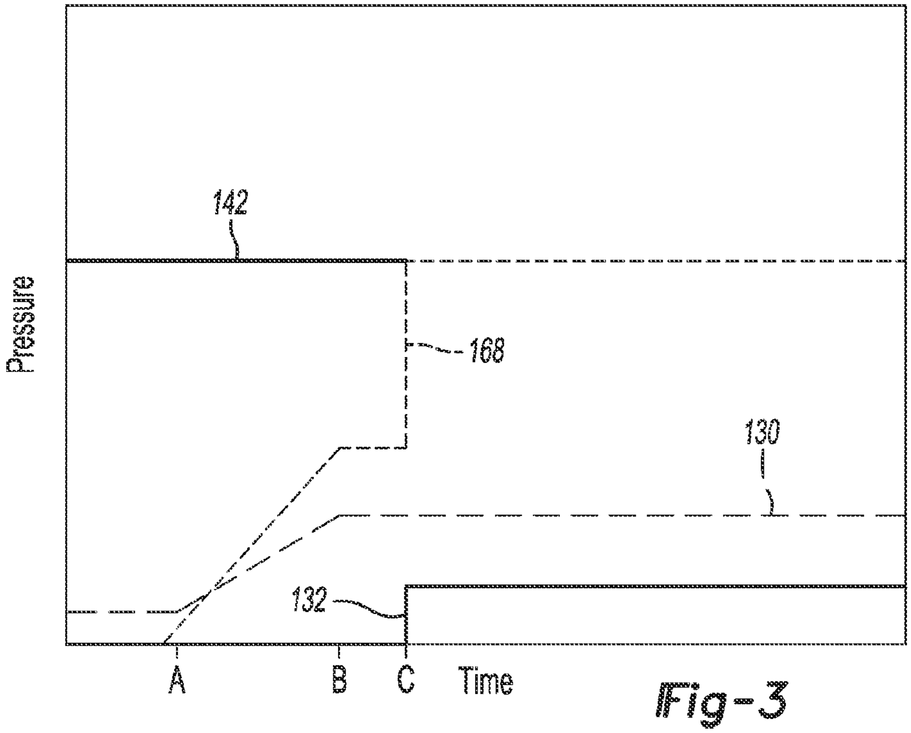
FIG. 3 is a graph illustrating the engagement of components within the hydraulic control system during a clutch boost operating condition.

Turning now to FIG. 3, and with continued reference to FIG. 2, a graph is shown illustrating the engagement of components of the clutch and torque converter control subsystem 110 during a clutch boost operating condition. The graph qualitatively illustrates the pressure output of the actuator feed line 142, the pressure at the clutch 168, the output pressure from the clutch control solenoid 130, and the output pressure from the TCC control solenoid 132 vs. time. To engage the clutch 168, the clutch control solenoid 130 increases output pressure at time "A" which in turn adjusts the output pressure from the clutch pressure regulation valve assembly 122. The TCC control solenoid 132 is closed and the pressure from the clutch control solenoid 130 is insufficient to move the boost valve 152 to the boost mode. Thus, the pressure at the clutch 168 is regulated by the clutch pressure regulation valve assembly 122 and is proportional to the output pressure from the clutch control solenoid 130 from time "A" to time "B". At time "C" boost mode is initiated by commanding an output pressure from the TCC control solenoid 132. The combined output pressures from the clutch control solenoid 130 and the TCC control solenoid 132 move the boost valve 152 to the boost position, and actuator feed pressure 142 is directed through the boost valve assembly 120 to the manual valve 124 to the clutch actuator 168. The TCC control solenoid 132 output pressure is sufficient to move boost valve 152 to the boost position without the aid from clutch control solenoid 130.

Figure 4:
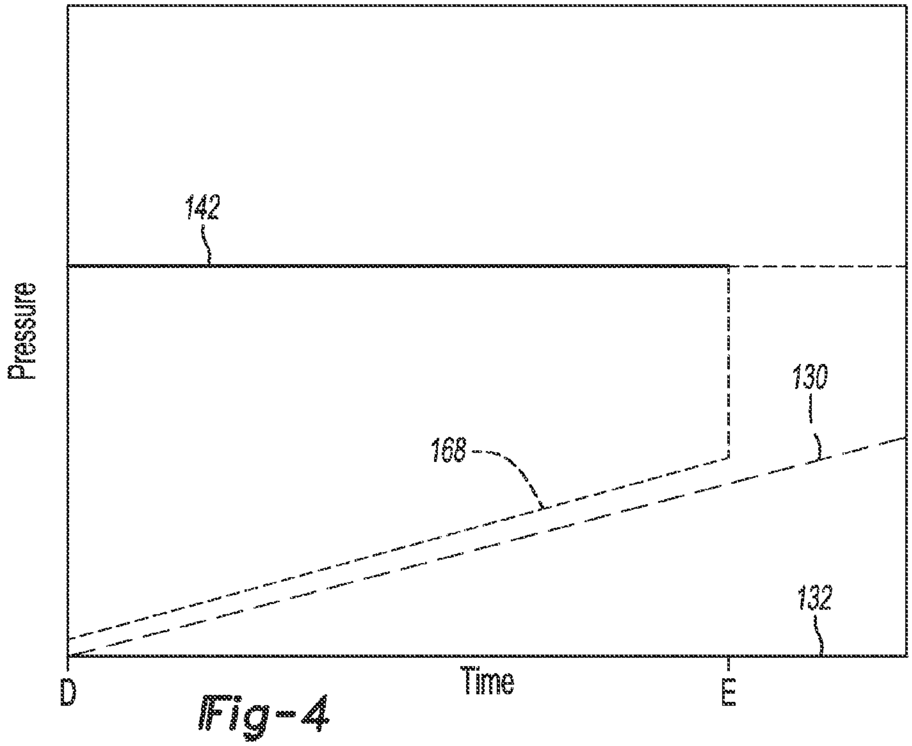
FIG. 4 is a graph illustrating the engagement of components within the hydraulic control system during a clutch boost failure mode operating condition.

Turning to FIG. 4, and with continued reference to FIG. 2, a graph is shown illustrating the engagement of components of the clutch and torque converter control subsystem 110 during a TCC control solenoid 132 failure mode operating condition. The graph qualitatively illustrates the pressure output of the actuator feed line 142, the pressure at the clutch 168, the output pressure from the clutch control solenoid 130, and the output pressure from the TCC control solenoid 132 vs. time. Generally, in the unlikely event that the TCC control solenoid 132 or the TCM 40 fails (either due to mechanical or electrical faults), the clutch control solenoid 130 is operable to move the boost valve 152 to the boost position by acting through port 120B. For example, to engage the clutch 168, the clutch control solenoid 130 increases output pressure at time "D" which in turn adjusts the output pressure from the clutch pressure regulation valve assembly 122. The TCC control solenoid 132 is closed and the pressure from the clutch control solenoid 130 is insufficient to move the boost valve 152 to the boost mode. Thus, the pressure at the clutch 168 is regulated by the clutch pressure regulation valve assembly 122 and is proportional to the output pressure from the clutch control solenoid 130 from time "D" to time "E". At some time prior to time "E" if the TCC control solenoid 132 fails, the output pressure from the clutch control solenoid 130 is commanded to continue to increase. At time "E" boost mode is initiated when the pressure output from the clutch control solenoid 130 overcomes the biasing member 156 and moves the boost valve 152 to the boost position.

Figure 5:
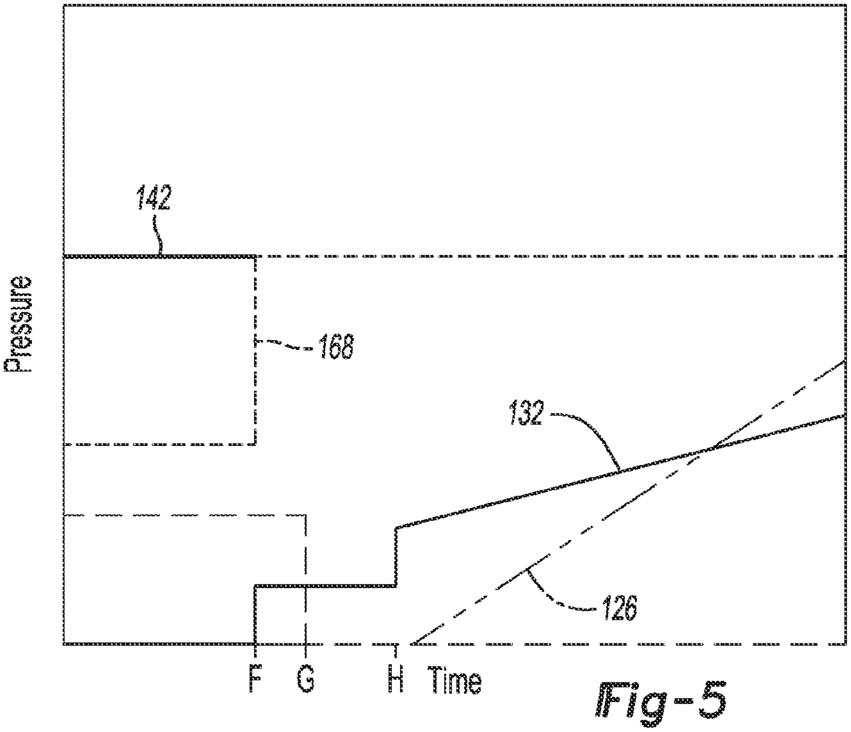
FIG. 5 is a graph illustrating the engagement of components within the hydraulic control system during a TCC apply operating mode.

Turning now to FIG. 5, and with continued reference to FIG. 2, a graph is shown illustrating the engagement of components of the clutch and torque converter control subsystem 110 during a TCC apply operating condition. The graph qualitatively illustrates the pressure output of the actuator feed line 142, the pressure at the clutch 168, the output pressure from the clutch control solenoid 130, the output pressure from the TCC control solenoid 132, and the output pressure from the TCC pressure regulation valve assembly 126 vs. time. At time "F", the TCC control solenoid 132 is commanded to a first pressure to move the boost valve 152 to the boost position. At time "G" the clutch control solenoid 130 is commanded to close as the actuator feed line 142 pressure keeps the clutch 168 engaged and the torque converter control valve assembly 128 moves to the apply position. At time "H" the TCC control solenoid 132 is commanded to a second pressure that commands a proportional output pressure from the TCC pressure regulation valve assembly 126. The output pressure from the TCC pressure regulation valve assembly 126 is communicated through the torque converter control valve assembly 128 to the torque converter 16 to engage the TCC 18.

Figure 6:
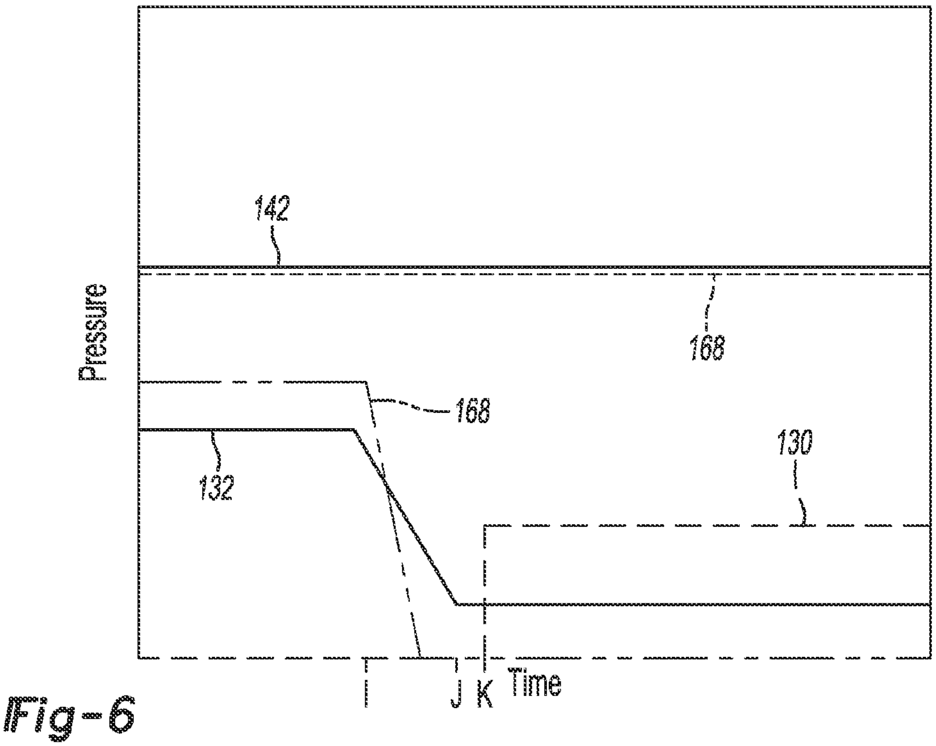
FIG. 6 is a graph illustrating the engagement of components within the hydraulic control system during a TCC release operating mode.

Turning now to FIG. 6, and with continued reference to FIG. 2, a graph is shown illustrating the engagement of components of the clutch and torque converter control subsystem 110 during a TCC release operating condition. The graph qualitatively illustrates the pressure output of the actuator feed line 142, the pressure at the clutch 168, the output pressure from the clutch control solenoid 130, the output pressure from the TCC control solenoid 132, and the output pressure from the TCC pressure regulation valve assembly 126 vs. time. To release the TCC 18, the output pressure from the TCC control solenoid 132 is reduced at time "I" through to time "J" to a pressure value that maintains the boost mode. The output pressure from the TCC pressure regulation valve assembly 126 proportionally drops to zero during this time interval, thus releasing the TCC 18. Finally, at time "K" the clutch control solenoid 130 is commanded to a pressure level sufficient to move the torque converter control valve 196 to the release position.

It should be appreciated that other orifice and check ball arrangements can be used without departing from the scope of present invention, including a single orifice for fill and exhaust, or filling through a single orifice and exhausting through two orifices. Likewise while individual fluid lines have been described, it should be appreciated that fluid lines, flow paths, passageways, etc., may contain other shapes, sizes, cross-sections, and have additional or fewer branches without departing from the scope of the present invention.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for a powertrain in a motor vehicle, the powertrain having a torque converter with a torque converter clutch (TCC) connectable with a continuously variable transmission, the transmission having a forward clutch and a reverse clutch, the hydraulic control system comprising:

- a pressure regulator subsystem providing a pressurized hydraulic fluid;
- a cooler subsystem for reducing a temperature of the pressurized hydraulic fluid;
- a manual valve assembly configured to selectively communicate the pressurized hydraulic fluid to the forward clutch and the reverse clutch;
- a torque converter control valve assembly connected to the TCC and the cooler subsystem, wherein the torque converter control valve assembly includes a control valve moveable between an apply position that allows pressurized hydraulic fluid to communicate with an apply side of the TCC and a release position that allows pressurized hydraulic fluid to communicate with a release side of the TCC and then to the cooler subsystem;
- a boost valve assembly connected to the pressure regulator subsystem, the manual valve assembly, and the torque converter clutch control valve assembly, wherein the boost valve assembly includes a boost valve moveable between a boost position that allows pressurized hydraulic fluid from the pressure regulator subsystem to communicate with the manual valve, and a failsafe position that allows pressurized hydraulic fluid from the pressure regulator subsystem to communicate with the torque converter control valve assembly through to the cooler subsystem;
- a clutch control solenoid configured to move the boost valve to the boost position and the control valve to the release position and to control a pressure of the hydraulic fluid provided to the manual valve assembly; and
- a TCC control solenoid configured to move the boost valve to the boost position and to control a pressure of the hydraulic fluid provided to the torque converter control valve assembly.

2. The hydraulic control system of claim 1 further comprising a clutch pressure regulator valve assembly disposed downstream of the clutch control solenoid and the pressure regulator subsystem and upstream of the boost valve assembly, wherein the clutch pressure regulator valve assembly regulates a pressure of hydraulic fluid from the pressure regulator subsystem provided to the boost valve assembly based on an output from the clutch control solenoid.

3. The hydraulic control system of claim 2 wherein the boost valve allows the regulated pressurized hydraulic fluid from the clutch control solenoid to communicate with the manual valve when the boost valve is in the failsafe position.

4. The hydraulic control system of claim 1 further comprising a TCC pressure regulator valve assembly disposed downstream of the TCC control solenoid and the pressure regulator subsystem and upstream of the torque converter control valve assembly, wherein the TCC regulator valve assembly regulates a pressure of hydraulic fluid from the pressure regulator subsystem provided to the torque converter control valve assembly based on an output from the TCC control solenoid.

5. The hydraulic control system of claim 1 wherein the clutch control solenoid is normally high.

6. The hydraulic control system of claim 1 wherein the TCC control solenoid is normally low.

7. The hydraulic control system of claim 1 wherein the clutch control solenoid moves the boost valve to the boost position if the TCC control solenoid fails.

8. The hydraulic control system of claim 1 wherein the control valve is biased to the apply position by a first spring.

9. The hydraulic control system of claim 1 wherein the boost valve is biased to the failsafe position by a second spring.

10. A hydraulic control system for a powertrain in a motor vehicle, the powertrain having a torque converter with a torque converter clutch (TCC) connectable with a continuously variable transmission, the transmission having a forward clutch and a reverse clutch, the hydraulic control system comprising:

- a pressure regulator subsystem providing a pressurized hydraulic fluid;
- a cooler subsystem for reducing a temperature of the pressurized hydraulic fluid;
- a manual valve assembly configured to selectively communicate the pressurized hydraulic fluid to the forward clutch and the reverse clutch;
- a torque converter control valve assembly having a first feed inlet, a second feed inlet connected to the pressure regulator subsystem, an apply port connected to an apply side of the TCC, a release port connected to a release side of the TCC, a cooler port connected to the cooler subsystem, and a failsafe port, and wherein the torque converter control valve assembly includes a control valve moveable between an apply position where the first feed inlet communicates with the apply port, and a release position where the second feed inlet communicates with the release port and the apply port communicates with the cooler port;
- a boost valve assembly having a first inlet port connected with the pressure regulator subsystem, a second inlet port connected with the pressure regulator subsystem, a manual valve outlet port connected with the manual valve, and a failsafe port connected to the failsafe port of the torque converter control valve assembly, and wherein the boost valve assembly includes a boost valve moveable between a boost position where the first inlet port communicates with the manual valve outlet port and a failsafe position where the second inlet port communicates with the failsafe port;
- a clutch control solenoid configured to move the boost valve to the boost position and the control valve to the release position and to control a pressure of the hydraulic fluid provided to the manual valve assembly; and
- a TCC control solenoid configured to move the boost valve to the boost position and to control a pressure of the hydraulic fluid provided to the torque converter control valve assembly.

11. The hydraulic control system of claim 10 wherein when the TCC is disengaged and the control valve is in the release position, hydraulic fluid communicates from the torque converter through the apply port and the cooler port into the cooler subsystem.

12. The hydraulic control system of claim 10 wherein when the boost valve is in the failsafe position and the control valve is in the apply position, hydraulic fluid is communicated through the boost valve assembly to the failsafe port, and from the failsafe port to the release port to disengage the TCC.

13. The hydraulic control system of claim 10 further comprising a clutch pressure regulator valve assembly having an inlet connected to the pressure regulator subsystem, and an outlet connected to a third inlet of the boost valve assembly, wherein the clutch pressure regulator valve assembly regulates a pressure of hydraulic fluid from the inlet to the outlet based on an output from the clutch control solenoid.

14. The hydraulic control system of claim 13 wherein the third inlet of the boost valve assembly communicates with the manual valve outlet when the boost valve is in the failsafe position.

15. The hydraulic control system of claim 10 further comprising a TCC pressure regulator valve assembly disposed downstream of the TCC control solenoid and having an inlet connected to the pressure regulator subsystem and an outlet connected to the first feed inlet of the torque converter control valve assembly, wherein the TCC regulator valve assembly regulates a pressure of hydraulic fluid from the inlet to the outlet based on an output from the TCC control solenoid.

* * * * *